(No Model.)

W. N. WILKINSON.
BELT PULLEY.

No. 364,878. Patented June 14, 1887.

Witnesses.
J. A. Rutherford.
Robert Everitt.

Inventor,
William N. Wilkinson,
By James L. Norris,
Atty.

UNITED STATES PATENT OFFICE.

WILLIAM NEEDHAM WILKINSON, OF LONGSIGHT, MANCHESTER, COUNTY OF LANCASTER, ASSIGNOR OF ONE-HALF TO JAMES STOTT, OF LONDON, ENGLAND.

BELT-PULLEY.

SPECIFICATION forming part of Letters Patent No. 364,878, dated June 14, 1887.

Application filed March 8, 1887. Serial No. 230,111. (No model.) Patented in England December 9, 1884, No. 16,146, and in Belgium December 7, 1886, No. 75,512.

*To all whom it may concern:*

Be it known that I, WILLIAM NEEDHAM WILKINSON, a subject of the Queen of Great Britain, residing at Longsight, Manchester, county of Lancaster, England, have invented new and useful Improvements in Belt-Pulleys, (for which I have obtained a patent in Great Britain, No. 16,146, dated December 9, 1884; also in Belgium, No. 75,512, dated December 7, 1886,) of which the following is a specification.

This invention has for its object to provide a novel pulley for transmitting power conveyed by belting; and to such end the invention consists in the features of construction hereinafter described and claimed, reference being made to the accompanying drawings, in which—

Figure 1:
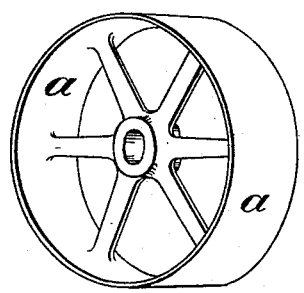
Figure 2:
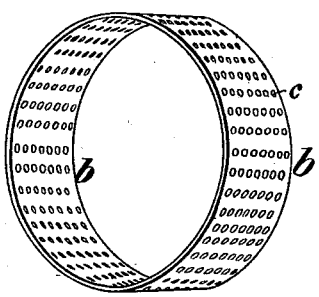
Figure 3:
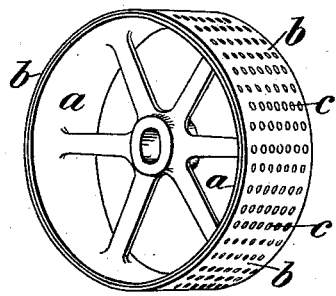
Figure 4:
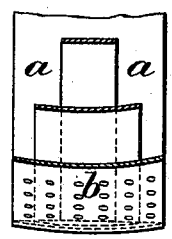

Figure 1 is a perspective view of an armed or spoked pulley; Fig. 2, a detached perspective view of the band to fit the periphery of the pulley; Fig. 3, a perspective view of the completed pulley; Fig. 4, a detail sectional view showing a modification of the invention; and Fig. 5, a sectional view of a pulley having the attached band showing a modification of the invention.

In order to enable those skilled in the art to make and use my invention, I will now describe the same in detail, referring to the drawings, where—

The letter $a$ indicates the imperforate rim of a pulley connected by arms or spokes with the hub in the usual manner.

The letter $b$ indicates an annular band adapted to accurately fit the rim of the pulley and furnished throughout its area with recesses formed by numerous perforations $c$, which, as shown, extend in rows from edge to edge of the band around its entire circumference. This constitutes the friction or driving surface for the belting, while the separate and supplemental band serves to strengthen such pulleys, especially those which have been long in use and exhibit a weakened appearance or a smooth mirror-like surface. The recesses formed by the perforations increase the friction or biting capacity of the pulley and enable a maximum of speed to be obtained with a minimum loss of power resulting from the belting slipping on the faces of the pulleys. The band is preferably of metal and is secured to the imperforate rim of the pulley by any means suitable to meet the conditions required—as, for instance, by shrinking the band on the rim or attaching it by screws, rivets, solder, or otherwise. The internal diameter of the band is equal or approximately so to the external diameter of the pulley to which it is to be applied.

By making the recessed band a separate device it can be applied to a pulley already in use. In the modification shown in Fig. 4 the pulley has a convex external surface produced by first attaching to the rim $a$ a narrow annular ring (one or more) and then applying over the same the recessed or perforated band $b$.

Figure 5:
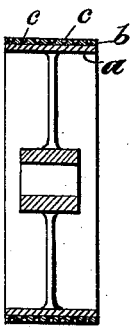

The perforations extending entirely through the band, as in Fig. 2, in connection with the pulley-rim, form recesses, but the latter can be formed as in Fig. 5, where they do not extend entirely through the band.

I am aware that the rim of a pulley has been formed integral with air-passages for the escape of air from between the belt and the surface of the pulley-rim. Such, therefore, I disclaim.

Having thus described my invention, what I claim is—

1. A belt-pulley having applied to its rim a separate annular band provided with rows of recesses extending from edge to edge and entirely around its circumference, substantially as described.

2. A convex-faced pulley consisting of narrow rings applied around the rim of the pulley, and a band secured to the rim over said narrow rings and provided with rows of recesses extending from edge to edge and around its circumference, substantially as described.

In witness whereof I have hereto signed my name in the presence of two subscribing witnesses.

WILLIAM NEEDHAM WILKINSON.

Witnesses:
  ARTHUR C. HALL,
    *9 Main st., Manchester.*
  I. J. THORP.
    *Cromford Ct., Manchester.*